United States Patent [19]
Gorski

[11] Patent Number: 6,032,493
[45] Date of Patent: Mar. 7, 2000

[54] H-28 GLASS FORMING MACHINE

[75] Inventor: Richard Alan Gorski, West Suffield, Conn.

[73] Assignee: Emhart Glass S.A., Cham, Switzerland

[21] Appl. No.: 09/206,140

[22] Filed: Dec. 7, 1998

[51] Int. Cl.⁷ .................................................. C03B 9/00
[52] U.S. Cl. ..................... 65/237; 65/79; 65/227; 65/229; 65/307; 65/360
[58] Field of Search ................. 65/79, 229, 237, 65/307, 360, 227

[56] References Cited

U.S. PATENT DOCUMENTS

| | | | |
|---|---|---|---|
| 3,792,988 | 2/1974 | Nowak et al. | 65/79 |
| 3,951,637 | 4/1976 | Schaar | 65/229 |
| 4,052,187 | 10/1977 | Spaeth et al. | 65/160 |
| 4,273,569 | 6/1981 | Staley | 65/360 |

*Primary Examiner*—Sean Vincent
*Attorney, Agent, or Firm*—Spencer T. Smith

[57] ABSTRACT

An H-28 machine has a plurality of identical sections each processing a gob of molten glass into a parison and then into a piece of ware each complete revolution of the section. Each section includes a blank mold displaceable between a parison forming position and a retracted position by blank mold down air.

Each section also includes a plunger which is displaceable from an elevated position down to the parison forming position and a neck ring assembly which includes an air motor. Finally the section also includes a blow mold displaceable from a remote position to a closed position. The air motor is operated from the time that the blank mold begins its displacement from the parison forming position to the retracted position by a valve which connects blank mold down air to the air motor.

1 Claim, 2 Drawing Sheets

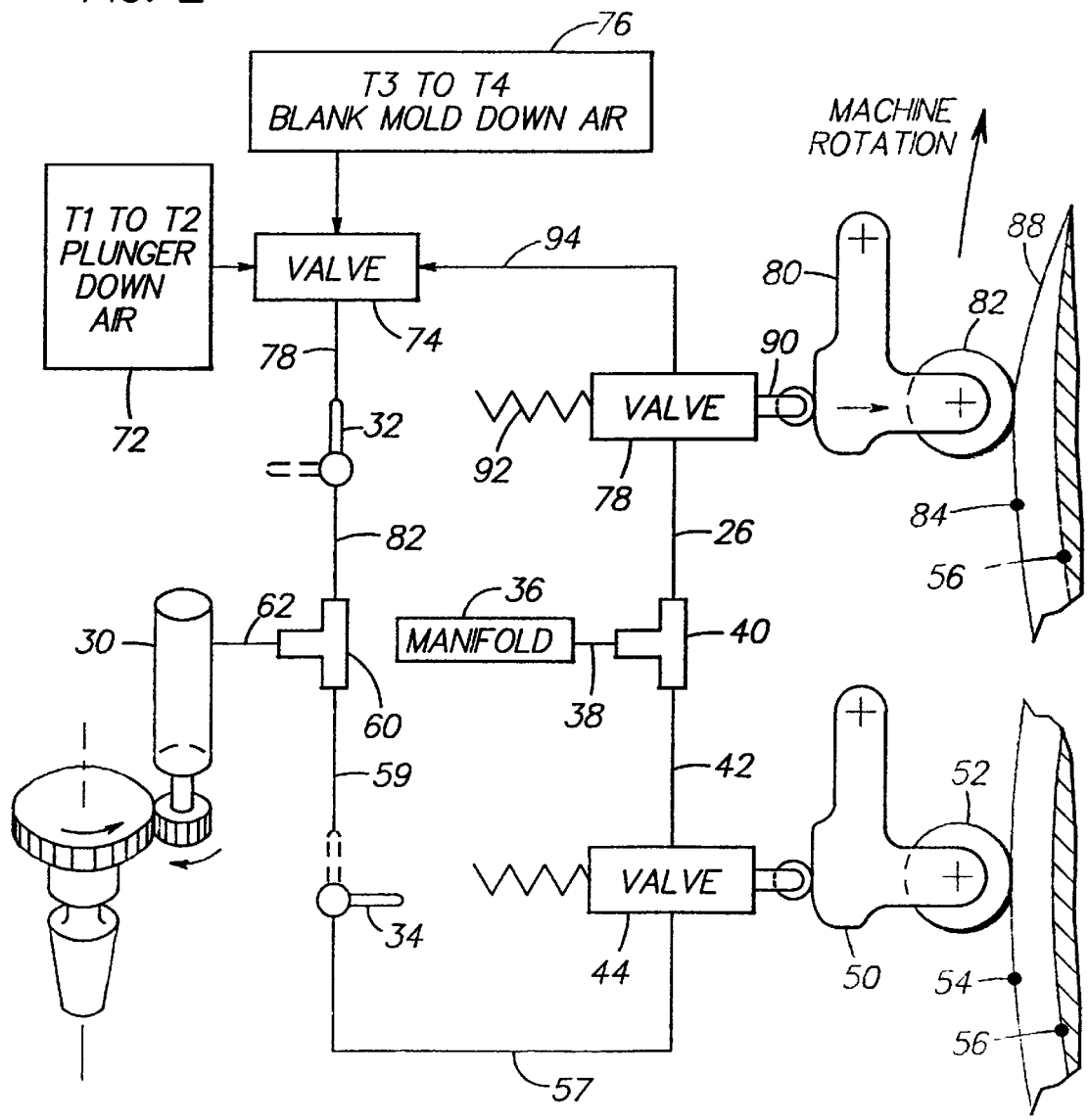

H-28 GLASS FORMING MACHINE

BACKGROUND OF THE INVENTION

The present invention relates to a glassware forming machine, generally referred to as such as machine, which has a plurality of sections supported for rotation about a vertical central axis and more particularly to such a machine set up for hot mold operation. Each section of the machine performs the process steps for making a piece of glassware in one complete revolution of the machine.

In an H-28 machine, a gob of molten glass is delivered to a blank mold which is then relocated to the press position. A plunger is lowered to form the parison which includes a "moile" formed in a neck ring. The parison will thereafter be supported at the moile. When the plunger is raised and the blank mold is returned to its start position, the blow mold, which includes two parts movable towards and away from each other and an upwardly displaceable bottom plate, is closed around the parison so that the parison can be blown, by a blowhead which is displaced to a location above the neck ring, into the finished piece of glassware.

The machine can be set up for paste mold operation where the parison is rotated in the blow mold to form a round, seamless piece of glassware or for hot mold operation where the parison is not rotated in the blow mold to form a non-round, angular piece of glassware. For paste mold operation, the neck ring starts to rotate the parison as soon as the blank mold is lowered. If the parison were not rotated, the portion of the parison facing the direction of machine rotation would be cooled at a greater rate than the portion facing away. By rotating the parison, the cooling rate is equalized so that the parison temperature is kept symmetrical which is required for even wall thickness when the parison is blown into the finished piece of glassware. The neck ring rotation is effected by an air motor whose air supply is timed by a valve controlled by a cam ring on the cam drum. This cam ring is continuous for the duration of the desired time for neck ring rotation. For paste mold operation, neck ring rotation starts when the blank is lowered and continues while the blow mold is closed (when the parison is being blown into the finished piece of glassware) and stops just after the blow mold is opened for the take out. This means that the continuous cam ring which controls neck ring rotation is approximately 180 degrees of the 360° cycle. For hot mold operation, it would be an advantage to rotate the parison as soon as the blank mold is lowered so as to maintain temperature symmetry. Since the neck ring is not rotated while the blow mold is closed in hot mold operation, this rotation would have to be limited to a few degrees. To remove the 180 degree cam ring and replace it with one of a shorter duration, is a time consuming process as sections would have to be removed to provide access to the central cam drum resulting in lost production time.

OBJECT OF THE INVENTION

It is accordingly an object of this invention to provide a short period of neck ring rotation for hot mold operation starting as soon as the blank mold is lowered until the blow mold starts to close or is closed but before the parison is blown into the finished piece of glassware without having to access the central cam drum and that the change in neck ring rotation duration between paste mold operation and hot mold operation can be performed quickly without lost production time.

Other objects and advantages of the present invention will become apparent from the following portion of this specification and from the accompanying drawings that illustrate in accordance with the mandate of the patent statutes a presently preferred embodiment incorporating the principles of the invention.

BRIEF DESCRIPTION OF THE DRAWINGS

Referring to the drawings:

FIG. 2 shows, schematically, a timing circuit to provide a short period of neck ring rotation until the blow mold starts to close in accordance with the teachings of the present invention;

BRIEF DESCRIPTION OF THE PREFERRED EMBODIMENT

Figure 1:
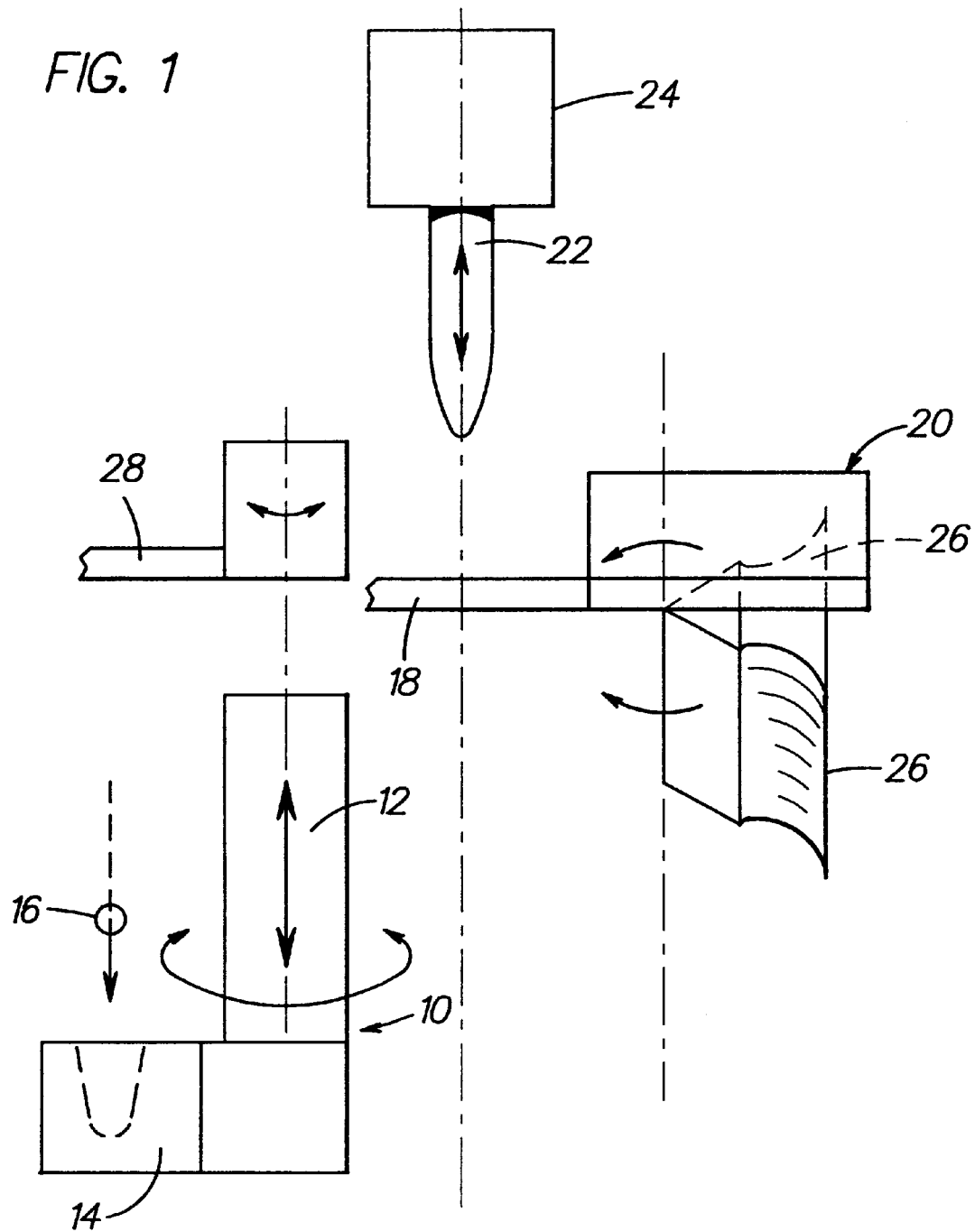
FIG. 1 schematically illustrates the operation of a glass forming machine.

The glass forming machine has a number of identical sections which define a circular carousel. In 360° of movement of each section a complete glass forming operation is completed. A blankmold assembly 10 which includes a pneumatically operated blankmold cylinder 12 and a blankmold 14 is vertically and rotationally displaceable. The blankmold, which receives a gob of molten glass 16 at the illustrated gob delivery position, can accordingly be elevated and rotated to the parison forming position beneath a neck ring 18 which is part of an air operated neck ring assembly 20. A plunger 22, which is part of a press cylinder assembly 24, is lowered through an opening in the neck ring and forms the gob into a parison with the "moile" of the parison, formed in the neck ring (the parison will thereafter be held by the moile in the neck ring). The blankmold is returned to the gob delivery position and the blow molds 26 are closed around the parison. A blowhead 28 pivots over the neck ring and blows the parison into the final ware (the actual product will be defined by cutting the moile off).

The operation of the section mechanisms is conventionally controlled by turning switches or valves on and off by individual followers which engage circumferential cams which are supported on an annular timing drum.

The neck ring assembly includes an air motor 30 (FIG. 2). In paste mold operation, a first ball valve 32 is closed and a second ball valve 34 is open (the dotted positions). A manifold 36, which provides a compressed air supply, has an outlet pipe 38 connected to a first tee 40 which connects through a pipe 42 to a mechanical normally closed valve 44 which is held in an open position, whenever the blow molds are closed, by a lever 50 which has a cam follower 52 which rides on a continuous "neck ring rotate" cam ring 54 mounted on the central cam drum 56. Air accordingly flows through the valve 44 into a pipe 57 though the open valve 34, through a pipe 59 and a second tee 60, and through pipe 62 to the air motor 30 whenever the cam follower is on the cam.

During hot mold operation the upper ball valve 32 is open and the lower ball valve 34 is closed. The flow path through valve 44 accordingly becomes inactive. When the pressurized air for displacing the plunger down to press the parison is turned "on" for a period of time sufficient to complete plunger movement, a portion of that plunger down air (T1 to T2 (time 1 to time 2) Plunger Down Air/72) is used as pilot air to move the actuator of a pneumatic valve 74 into a first position (the actuator of the valve 74 is bistable and it accordingly will remain in this position until displaced back to the closed position). Accordingly the T3 to T4 Blank Mold Down Air 76, which is turned on after the plunger down air is turned off, will then flow through the pneumatic valve 74, through a pipe 78, through the open upper ball valve 32, through pipe 82, to the second tee 60 and pipe 62 to the air motor 30. Accordingly the parison will be rotated by the air motor.

The blow molds may begin movement before the blank molds reach the retracted position. A second mechanical normally open valve 78 is controlled by a lever 80 which has a cam follower 82 which rides on a continuous "blow molds open" cam ring 84 mounted on the central cam drum 56.

This second lever 80 is pivoted to a valve closed position whenever the cam rides on the cam but when the cam follower 82 comes to the runoff portion 88 of the cam 84 (the blow molds will begin to close), the blow mold lever 80 starts to move away from the valve 78 allowing the valve actuator 90, which is pushed by a spring 92, to move into an open position. The supply air from the manifold 36 will flow through the second mechanical valve 78 as pilot air 94 to move the actuator of the pneumatic valve 74 into a second position to thereafter prevent the blank cylinder down air 76 from flowing through they valve 74 thus stopping the rotation of the air motor 30 (in the event the duration T3–T4 ends before the blow mold open valve 78 is opened, the manifold air will simply reset the pneumatic valve 74). When the parison is blown into the finished piece of glassware, the cam follower 82 rides up on the cam 84 to open the blow mold. The blow mold lever 80 moves towards the valve actuator 90 and moves it into the closed position so that the pilot air 94 goes off before the plunger begins to come down to press the parison starting the next cycle.

If desired, adjustability can be added by reversing the direction of the mold open valve 78 and driving the actuator with an adjustable operator carried by a linkage assembly connected to the lever 80.

I claim:

1. A machine having a plurality of identical glass forming sections rotating about a vertical central axis each processing a gob of molten glass into a parison and then into a piece of ware each complete revolution of the section, each of said sections comprising a blank mold displaceable between a parison forming position and a retracted position, means for displacing said blank mold from the parison forming position to the retracted position including a source of blank mold down air, a plunger displaceable from an elevated position down to the parison forming position, means for displacing said plunger from the elevated position to the parison forming position including a source of plunger down air, a neck ring assembly including an air motor, a source of air motor air, a blow mold displaceable between open and closed positions, and means for displacing said blow mold including a cam having blow mold closed and blow mold open segments, a first valve receiving air from said source of air motor air, said first valve including an actuator shiftable between closed and open positions, a lever carrying a cam follower for following said cam and for displacing said actuator from the open position to the closed position when said cam follower moves from said blow mold open cam segment to said blow mold closed cam segment, and means for operating said air motor from the time that said blank mold begins its displacement from the parison forming position to the retracted position until the time when the blow mold begins its displacement from the open position to the closed position including a bistable valve having first and second positions for connecting said source of blank mold down air to said air motor when said bistable valve is at the first position, said bistable valve receiving air from said first valve when said cam follower transfers from said open blow mold segment to said closed blow mold segment to shift the bistable valve to the second position, and said bistable valve receiving said plunger down air to shift the bistable valve to the first position.

* * * * *